No. 863,621. PATENTED AUG. 20, 1907.
L. M. MEDBURY.
DEVICE FOR MOLDING BUTTER PREPARATIVELY TO CUTTING IT INTO
INDIVIDUAL PORTIONS.
APPLICATION FILED OCT. 9, 1905.
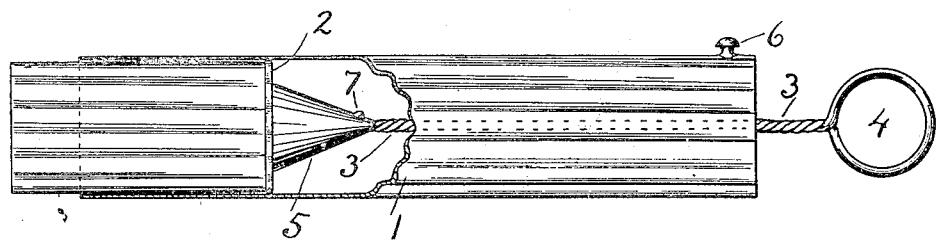
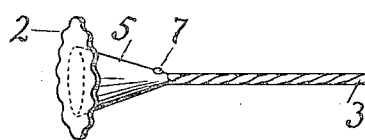
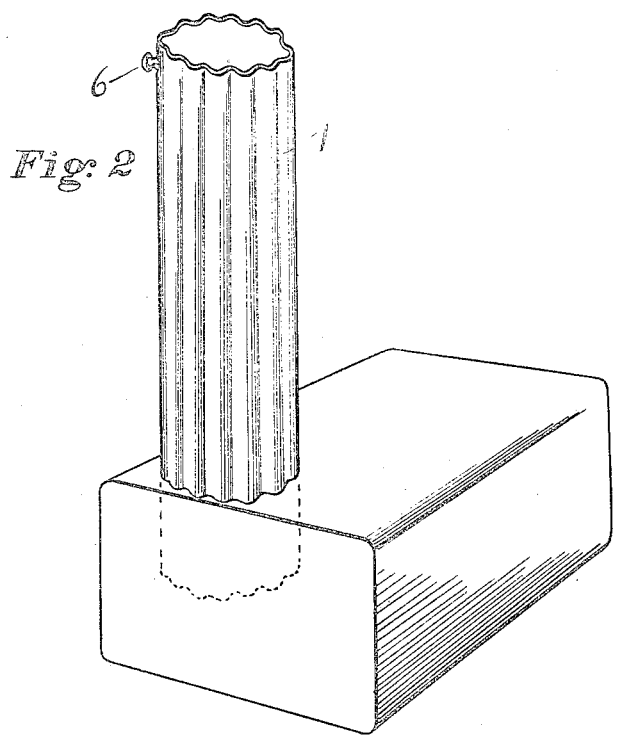
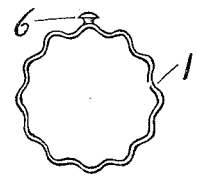
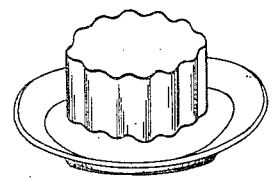
WITNESSES:
INVENTOR.

UNITED STATES PATENT OFFICE.

LORA M. MEDBURY, OF ALAMEDA, CALIFORNIA.

DEVICE FOR MOLDING BUTTER PREPARATIVELY TO CUTTING IT INTO INDIVIDUAL PORTIONS.

No. 863,621.        Specification of Letters Patent.        Patented Aug. 20, 1907.

Application filed October 9, 1905. Serial No. 282,051.

*To all whom it may concern:*

Be it known that I, LORA M. MEDBURY, a citizen of the United States of America, residing at Alameda, in the county of Alameda and State of California, have invented a new and useful Device for Molding Butter Preparatively to Cutting It into Individual Portions, of which the following is a specification, reference being had therein to the accompanying drawings.

This invention is an improvement in devices for forming butter into cakes or balls of suitable size and shape for use upon the table.

The usual means employed at present by housewives and others for this purpose, is a pair of wooden paddles. When these are used, the butter must be cut into small pieces, taken between the paddles, and worked between them into the desired shape, but except when performed by one long experienced in the use of the paddles, the operation is not easy nor very likely to be successful, since the butter sticks to them unless they are kept properly moist, the balls formed are seldom of uniform size or shape, and more or less of the butter is bound to be wasted through sticking to the paddles, and through dropping from between them during the process of rolling, and falling upon the floor or other place where it comes in contact with dirt and is rendered unfit for use. Then, too, the paddles are liable to wear rough, to crack, or otherwise become unfit for the purpose they are made to serve. When they are employed, the butter must be thoroughly iced and rendered firm before the operation of rolling can take place, necessitating the storing of the whole square of butter from which the balls are to be made, near the ice, and taking up space which might be sorely needed for something else. It is thought that these difficulties will be obviated by the use of the device herein described, since the butter may be pressed into it before being iced, without any waste whatever, and the mold containing the butter laid away in the ice-chest until ready for use, when the cakes of butter can be cut off as needed, the rest being left in the mold, and stored away in the ice-chest.

In the accompanying drawing, Figure 1 is a side view of the complete device, partly broken away to show the manner in which the butter is ejected from the mold. Fig. 2 is a perspective view of the mold and a square of butter, and illustrates the manner in which the butter is packed in the mold. Fig. 3 is a perspective view of a plunger used to push the butter from the mold. Fig. 4 is an end view of the mold. Fig. 5 illustrates a cake of butter molded by this device and ready for service upon the table.

The device consists of a metallic, tubular or cylindrical mold 1, and a metallic piston or plunger 2, the latter closely fitting into the former and being removable therefrom. The tube or cylinder 1 may be made of any desired metal, tin, on account of its lightness and cheapness, being deemed most suitable for the purpose. It is corrugated to give shape to the cake of butter which it is designed to mold, and also to allow of a greater cooling surface when it is placed in contact with a cooling agent. It may be made in any desired shape and of any desired size, but a tube or cylinder about one and a half or two inches in diameter by about six or eight inches in length is thought to be best adapted to the uses of an ordinary household. The shape of the cylinder or tube may be varied almost indefinitely, to suit varying tastes and requirements, fancy shapes such as those of the heart, cross, triangle etc., being sometimes desired for use at dinners and other gatherings.

The piston or plunger comprises a disk-shaped head 2, and a rod 3, provided on one end with a ring 4, and having at the other end a cone-shaped enlargement 5, supporting the piston-head, which is of the same width and shape as the inside of the cylinder or tube 1, and exactly fits into it. The length of the plunger from the point where the ring joins the rod to the outer surface of the piston-head is a little more than that of the cylinder. The conical enlargement on one end of the plunger-rod offers a suitable base upon which to fix the piston-head, enabling it to withstand the pressure exerted thereon when the butter is forced from the tube. Two buttons or indicators 6 and 7 are provided, one upon the outer surface of the cylinder 1 near one end, and the other upon the conical portion 5 of the plunger, at a point which corresponds with that whereon the indicator on the cylinder is placed when the plunger is inserted, these indicators being of great value when the shape of the device is irregular and the piston-head must be inserted in a particular position.

The device is very simple, and can be used by anyone without practice and with excellent results, all that is required being to take the cylinder, press it into the butter, and fill it up, place the filled cylinder in the ice-chest to cool, and when ready to serve, simply insert the plunger at one end, push out enough of the butter to make a cake of the desired size, cut it off with a knife, and serve. What remains in the tube may be kept fresh and ready for use without further trouble or inconvenience by simply placing the tube back in the ice-chest. When the balls are rolled by paddles, a large quantity of them is usually made, since they must be rolled when the butter is hard, and if any should be left over, they are fit for nothing but cooking, and the butter is practically wasted. No such waste occurs when this new device is employed, because the cakes of butter may be cut off as needed and what is not used may be left in the tube. Several of these tubes might be kept on hand, thus affording a variety of shapes and sizes of cakes.

The device can be made cheaply and is believed to be in every way practical.

Having now described my invention, what I claim, and desire to secure by Letters Patent of the United States, is:

A butter mold comprising a fluted cylinder of uniform diameter throughout and having an unobstructed interior, a knob shaped projection secured to the exterior and adjacent one end thereof, a plunger disconnected from the cylinder and having a disk the periphery of which is of substantially the same size and shape as the interior of the cylinder, a plunger rod formed of two strands of twisted wire having a loop at one end, a conical bracing member secured at its base to one face of the disk and at its apex to the end of the plunger rod opposite said loop, and a boss on said bracing member adapted to register with said button whereby the scallops on the disk may be inserted in their respective grooves in the cylinder.

In testimony whereof I affix my signature in presence of two witnesses.

LORA M. MEDBURY. [L. S.]

Witnesses:
MARGARET M. MEDBURY,
A. H. STE. MARIE.